United States Patent
Kaminski et al.

(10) Patent No.: US 11,720,698 B2
(45) Date of Patent: Aug. 8, 2023

(54) SYSTEMS AND METHODS FOR IMPLEMENTING AN INTERACTIVE CONTRACTOR DASHBOARD

(71) Applicant: JPMorgan Chase Bank, N.A., New York, NY (US)

(72) Inventors: Daniel Kaminski, East Northport, NY (US); Anjan Kumar, Bangalore (IN); Jonathan Lalima, Manalapan, NJ (US); Dror Barber, Teaneck, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 563 days.

(21) Appl. No.: 16/838,188

(22) Filed: Apr. 2, 2020

(65) Prior Publication Data

US 2020/0320212 A1    Oct. 8, 2020

Related U.S. Application Data

(60) Provisional application No. 62/828,095, filed on Apr. 2, 2019.

(51) Int. Cl.
*G06F 21/62* (2013.01)
*H04L 9/40* (2022.01)
(Continued)

(52) U.S. Cl.
CPC ...... *G06F 21/6218* (2013.01); *G06F 16/2246* (2019.01); *G06Q 10/105* (2013.01); *H04L 63/105* (2013.01)

(58) Field of Classification Search
CPC ............ G06F 21/6218; G06F 16/2246; G06Q 10/105; H04L 63/105
(Continued)

(56) References Cited

U.S. PATENT DOCUMENTS

| 6,141,778 A | * | 10/2000 | Kane ..................... G06F 21/604 |
| | | | 726/4 |
| 8,544,726 B1 | * | 10/2013 | Hahn ..................... G06Q 40/10 |
| | | | 235/376 |

(Continued)

FOREIGN PATENT DOCUMENTS

| CA | 2521988 A1 * | 4/2007 | ............. G06Q 10/06 |
| KR | 20070020941 A * | 2/2007 | |

OTHER PUBLICATIONS

Sage 100 Contractor 2018 (SQL) User's Guide, published Oct. 2018, 1139 pages. (Year: 2018).*

(Continued)

*Primary Examiner* — Luu T Pham
*Assistant Examiner* — Walter J Malinowski
(74) *Attorney, Agent, or Firm* — Greenblum & Bernstein, P.L.C.

(57) ABSTRACT

The invention relates to systems and methods that implement an interactive contractor dashboard. An embodiment of the present invention is directed to aggregating contingent labor data (firm-wide and globally) into a single consolidated infrastructure from multiple data feeds and systems. Once the data is aggregated, an embodiment of the present invention may apply entitlements, reduce the dataset accordingly and dynamically provide a customized interactive interface where the user may generate reports and access analytics for one or more contractors associated with the user.

18 Claims, 8 Drawing Sheets

(51) Int. Cl.
*G06F 16/22* (2019.01)
*G06Q 10/105* (2023.01)

(58) Field of Classification Search
USPC .......................................................... 726/28
See application file for complete search history.

(56) References Cited

U.S. PATENT DOCUMENTS

| | | | | |
|---|---|---|---|---|
| 10,319,029 | B1* | 6/2019 | Hockey | G06Q 40/12 |
| 2005/0065903 | A1* | 3/2005 | Zhang | G06Q 30/06 |
| 2005/0203836 | A1* | 9/2005 | Woodward | G06Q 40/02 |
| | | | | 705/39 |
| 2006/0015930 | A1* | 1/2006 | Shoham | H04L 63/126 |
| | | | | 726/6 |
| 2007/0011091 | A1* | 1/2007 | Smith | G06Q 20/10 |
| | | | | 705/39 |
| 2007/0124269 | A1* | 5/2007 | Rutter | G06Q 10/06 |
| 2008/0046266 | A1* | 2/2008 | Gudipalley | G06Q 10/00 |
| | | | | 705/305 |
| 2008/0052102 | A1* | 2/2008 | Taneja | G06Q 10/063 |
| | | | | 705/7.11 |
| 2009/0150981 | A1* | 6/2009 | Amies | H04L 67/02 |
| | | | | 726/5 |
| 2010/0324953 | A1* | 12/2010 | Janssen | G06Q 10/1097 |
| | | | | 705/7.21 |
| 2011/0055041 | A1* | 3/2011 | Shaw | G06Q 10/06 |
| | | | | 705/321 |
| 2011/0162034 | A1* | 6/2011 | Nagaratnam | G06F 21/604 |
| | | | | 726/4 |
| 2011/0219208 | A1* | 9/2011 | Asaad | G06F 9/06 |
| | | | | 712/12 |
| 2011/0227754 | A1* | 9/2011 | Hill | G06F 16/24556 |
| | | | | 340/870.01 |
| 2012/0047575 | A1* | 2/2012 | Baikalov | G06F 21/604 |
| | | | | 726/21 |
| 2012/0304307 | A1* | 11/2012 | Ramesh | G06Q 10/06 |
| | | | | 726/28 |
| 2012/0326873 | A1* | 12/2012 | Utter, II | G06F 3/016 |
| | | | | 340/573.1 |
| 2014/0258063 | A1* | 9/2014 | Chourasia | G06Q 40/00 |
| | | | | 705/35 |
| 2015/0046369 | A1* | 2/2015 | Taylor | G06Q 10/10 |
| | | | | 705/342 |
| 2015/0180891 | A1* | 6/2015 | Seward | H04L 63/1416 |
| | | | | 726/22 |
| 2016/0162141 | A1* | 6/2016 | Rowan | H04L 67/306 |
| | | | | 715/747 |
| 2017/0053080 | A1* | 2/2017 | Geppert | G16H 50/20 |
| 2017/0185962 | A1* | 6/2017 | Williams | H04L 67/535 |
| 2017/0270536 | A1* | 9/2017 | Williams | H04W 24/04 |
| 2017/0308573 | A1* | 10/2017 | Brisebois | G06F 16/24535 |
| 2018/0268157 | A1* | 9/2018 | Kamiya | G06F 21/6209 |
| 2018/0324216 | A1* | 11/2018 | Cross | H04L 63/20 |
| 2019/0114568 | A1* | 4/2019 | Ingle | G06Q 10/0835 |
| 2019/0139178 | A1* | 5/2019 | Cook | G06F 3/1238 |
| 2019/0243836 | A1* | 8/2019 | Nanda | G06F 16/24568 |
| 2019/0289011 | A1* | 9/2019 | Kamiya | H04L 63/0428 |
| 2020/0202472 | A1* | 6/2020 | Barak | H04W 4/021 |
| 2020/0280564 | A1* | 9/2020 | Badawy | H04L 63/20 |
| 2020/0296110 | A1* | 9/2020 | Kobel | G06F 16/26 |

OTHER PUBLICATIONS

Corena, Juan Camilo, and Tomoaki Ohtsuki. "Secure and fast aggregation of financial data in cloud-based expense tracking applications." Journal of Network and Systems Management 20, No. 4 (2012): 534-560. (Year: 2012).*

Etkind, Josh, Kame Bennaceur, M. Drnec, and Chris Luppens. "Knowledge portals support widely distributed oilfield projects." In IEEE International Professional Communication Conference, 2003. IPCC 2003. Proceedings., pp. 12-pp. IEEE, 2003. (Year: 2003).*

Marques, Paulo, Paulo Gomes, Marco Vieira, Juan Prieto, Vicente Navarro, and Mauro Pecchioli. "BIRF: Keeping Software Development under Control across the Organization." In 2009 Fourth International Conference on Software Engineering Advances, pp. 458-464. IEEE, 2009. (Year: 2008).*

* cited by examiner

530

Supplier SLA Breakdown

Current Selections

[ Home ] [ Clear ] [ Back ] [ Forward ]

| # | SLA Category | Min Service Level | Actual Supplier Level | Per Credit Weight | Credit Amount |
|---|---|---|---|---|---|
| 1 | Compliance with Rate Card | 100% | 100% | 15% | $0 |
| 2 | Resume submittals against all requirements | 100% | 98.5% | 5% | $111,111 |
| 3 | Resumes resulting in interviews | 25% | 35.6% | 10% | $0 |
| 4 | Interviews resulting in Offers | 30% | 20.3% | 5% | $111,111 |
| 5 | Offers resulting in Engagement starts | 50% | 92.9% | 10% | $0 |
| 6 | Use of third parties to provide Temp Workers | 0% | 0.0% | 15% | $0 |
| 7 | Compliance with onboarding requirements | 100% | 100% | 15% | $0 |
| 8 | Attrition – Terminations, voluntary and involuntary | 10% | NA | 5% | $0 |
| 9 | Completion of semi-annual audits | 100% | 100% | 15% | $0 |
| 10 | Market share of total program | 16.6% | 100% | 5% | $0 |

Supplier Total Spend $11,222,333 | Maximum Performance Credit $2,333,444 | Total Credit $333,444

540

| Weighted Rankings | SLA 1 | SLA 2 | SLA 3 | SLA 4 | SLA 5 | SLA 6 | SLA 7 | SLA 8 | SLA 9 | SLA 10 | Total |
|---|---|---|---|---|---|---|---|---|---|---|---|
| | | | | | | | | Switch Internal/External | | | |
| T Systems | 1.50 | 0.49 | 1.00 | 0.50 | 1.00 | 1.50 | 1.50 | 0.50 | 1.50 | 0.50 | 9.99 |
| International Corporation | 1.50 | 0.50 | 1.00 | 0.34 | 1.00 | 1.50 | 1.50 | 0.50 | 1.50 | 0.50 | 9.84 |
| Company.Com | 1.50 | 0.50 | 1.00 | 0.24 | 1.00 | 1.50 | 1.50 | 0.50 | 1.50 | 0.38 | 9.62 |
| Information Systems LLC | 1.50 | 0.44 | 1.00 | 0.29 | 1.00 | 1.50 | 1.50 | 0.50 | 1.50 | 0.23 | 9.46 |
| TECHNICAL SERVICES INC. | 1.50 | 0.50 | 1.00 | 0.39 | 1.00 | 1.50 | 1.50 | 0.00 | 1.50 | 0.50 | 9.39 |
| Consulting Solutions Inc | 1.50 | 0.48 | 1.00 | 0.25 | 1.00 | 1.50 | 1.50 | 0.00 | 1.50 | 0.34 | 9.07 |

Figure 5B

Staff Augmentation Bill Rate Analytics 710

| Rate as of | IND | HKD | EUR | SGD | AUD | GBP |
|---|---|---|---|---|---|---|
| 3/23/2020 | 69.79 | 7.83 | 0.89 | 51.05 | 1.45 | 0.79 |

718

Resources by Line of Business 712

- CCB 400
- CIB 600
- CORP SEC 700
- AWM 200
- COMM BANK 100

Top 10 by Rate Card Rate 714

- WILLIAMS, J. $500.00
- CARTER, V. $288.88
- PARSON, R. $277.77
- PARKER, J. $277.77
- WOLF, J. $255.55
- OWENS, N. $244.44
- JACOBS, A. $233.33
- KAHN, S. $233.33
- ZUCKERMAN, M. $222.22
- PARKS, A. $211.11

Resources by Function 716

- Technology 888
- Operations 555
- Finance 222
- Project & Process Mgmt 111
- Administration 110
- Marketing & Communications 100
- Office of the General Counsel 99
- Human Resources 55
- Risk 44
- Others 22

Resources by Location 720

- United States 1,104
- India 480
- United Kingdom 365
- Singapore 50
- Australia 33
- Hong Kong 28
- Ireland 13
- Luxembourg 1

Top 10 Rate Variances 722

| Candidate Name | Job Function | Actual Rate | Rate Card | Variance |
|---|---|---|---|---|
| CROWN, C. | Office of the General Counsel | $222.22 | $111.11 | $xx.xx |
| MCKEON, K. | Office of the General Counsel | $222.22 | $111.11 | $xx.xx |
| PINK, J. | Office of the General Counsel | $222.22 | $133.33 | $xx.xx |
| SPARK, M. | Office of the General Counsel | $222.22 | $144.44 | $xx.xx |
| SCHUMAN, A. | Office of the General Counsel | $222.22 | $144.44 | $xx.xx |
| ANDERSON, S. | Office of the General Counsel | $222.22 | $155.55 | $xx.xx |
| TUCKER, T. | Office of the General Counsel | $222.22 | $155.55 | $xx.xx |
| ROBINSON, M. | Office of the General Counsel | $222.22 | $155.55 | $xx.xx |
| CAMPBELL, A. | Office of the General Counsel | $222.22 | $199.99 | $xx.xx |
| NIELSON, A. | Office of the General Counsel | $222.22 | $199.89 | $xx.xx |

Detail 724

| S ID | Candidate Name | Hire Date | USD Hourly Actual Rate | USD Hourly Actual Rate | SID Exp Date | Region Id | Country | City | Department Name | Indicator | Job Family |
|---|---|---|---|---|---|---|---|---|---|---|---|
| NXXX70 | WILLIAMS, J. | 3/25/2020 | | $111.11 | 8/31/2020 | EMEA | United Kingdom | London | TECH FIN – OTHER | IT | Financial Analysis |
| RXXX558 | YURMAN, N. | 3/23/2020 | $88.88 | | 5/29/2020 | NAMR | United States | San Francisco | HEALTHCARE | NON-IT | Administrative Assistant |
| DXXX330 | BARTON, G. | 3/23/2020 | $66.66 | $70.00 | 6/19/2020 | NAMR | United States | Plano | DIGITAL CLIENT EXPERIENCE ... | NON-IT | Marketing |
| DXXX639 | SAMUELS, Y. | 3/23/2020 | $80.00 | $100.00 | 9/22/2020 | NAMR | United States | Westmont | PRODUCTION – IL – 111 | IT | Data Doc & Trans Processing |
| EXXX508 | CROSBY, T. | 3/23/2020 | $38.00 | $40.00 | 9/22/2020 | NAMR | United States | Chicago | MORTGAGE | NON-IT | Mortgage |
| EXXX620 | SAM, R. | 3/23/2020 | $35.00 | $38.00 | 9/22/2020 | NAMR | United States | Westmont | PRODUCTION – IL – 222 | NON-IT | Data Doc & Trans Processing |
| FXXX562 | MILLS, J. | 3/23/2020 | $38.00 | $38.00 | 9/22/2020 | NAMR | United States | Columbus | US CAP | NON-IT | Business Analysis & Reporting |
| FXXX482 | PRUITT, E. | 3/23/2020 | $54.00 | $45.05 | 6/22/2020 | NAMR | United States | Monroe | PREP AND DEPREP XXX | NON-IT | Service |

Figure 7

SYSTEMS AND METHODS FOR IMPLEMENTING AN INTERACTIVE CONTRACTOR DASHBOARD

CROSS REFERENCE TO RELATED APPLICATIONS

The application claims priority to U.S. Provisional Application 62/828,095, filed Apr. 2, 2019, the contents of which are incorporated herein in its entirety.

FIELD OF THE INVENTION

The invention relates generally to systems and methods for dynamically implementing an interactive dashboard, and more particularly to a comprehensive intelligent analysis and customized view of a contractor's relationship with an entity via an interactive contractor dashboard.

BACKGROUND OF THE INVENTION

Oftentimes, an entity will engage various contractors for many different tasks and functions. Current systems may provide a total amount of spend for a particular contractor for a time frame. However, there is no mechanism for bringing together the many facets of a contractor base. Accordingly, an entity is unable to ascertain a total contractor relationship without extensive efforts, time and resources.

There is currently no single process surrounding the reporting of contingent labor. Instead, contingent labor reporting is fragmented as it is primary done by the individual lines of business (LOBs) using a number of different tools, without any cross-LOB consolidation of information. Furthermore, reporting is broken down by the type of headcount (HC) and IT versus non-IT. As a result, there is no holistic reporting at the LOB level that encompasses contingent labor across multiple functions in the aggregate.

These and other drawbacks currently exist.

SUMMARY OF THE INVENTION

According to one embodiment, the invention relates to a computer implemented method that dynamically provides an interactive contractor dashboard. The method comprises the steps of: retrieving, via an electronic input, an organization directory associated with an entity; receiving, via a contractor feed, contractor data associated with an entity where the contractor feed retrieves data from one or more sources of contractor data; aggregating, via an aggregator engine, the data from the one or more sources of contractor data, wherein the organization directory is linked to the contractor data; receiving, via a user input, a request from a user from the organization directory; deriving, via a computer processor, an entitlements model for the user wherein the entitlements model comprises a customized hierarchy of data access; dynamically, via a computer processor, applying the entitlements model to the aggregated data; and communicating, via an interactive contractor dashboard, the aggregated data wherein the interactive contractor dashboard comprises a plurality of segments representing: workforce type, line of business; region; top labor providers and top job descriptions.

According to another embodiment, the invention relates to a computer implemented system that dynamically provides an interactive contractor dashboard. The system comprises: an input configured to receive a contractor feed from a plurality of data sources; an interactive contractor dashboard configured to provide interactive contractor data based on dynamically generated entitlements model for a specific user; and an aggregator engine, coupled to the input and the interactive contractor dashboard, comprising a computer processor configured to perform the steps of: retrieving an organization directory associated with an entity; receiving, via the contractor feed, contractor data associated with an entity where the contractor feed retrieves data from one or more sources of contractor data; aggregating, via the aggregator engine, the data from the one or more sources of contractor data, wherein the organization directory is linked to the contractor data; receiving a request from a user from the organization directory; deriving, via the computer processor, an entitlements model for the user wherein the entitlements model comprises a customized hierarchy of data access; dynamically, via the computer processor, applying the entitlements model to the aggregated data; and communicating, via the interactive contractor dashboard, the aggregated data wherein the interactive contractor dashboard comprises a plurality of segments representing: workforce type, line of business; region; top labor providers and top job descriptions.

The computer implemented systems and systems described herein provide unique advantages to global entities with many different supplier relationships, according to various embodiments of the invention. The innovative systems and methods implement an interactive comprehensive solution to contractor management and analytics. The innovation applies intelligence and data analytics to generate useful and timely statistics for various facets of the contractor relationship. With an embodiment of the present invention, a global entity is able to make informed decisions and action plans specific to contractors. Other advantages include efficiency and improved relationships with contractors in good standing. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIGS. 5A and 5B are an exemplary Staff Augmentation Dashboard, according to an embodiment of the present invention.

FIG. 7 is a Staff Augmentation interface, according to an embodiment of the present invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to aggregating contingent labor data (e.g., firm-wide, regionally, globally, etc.) into a single consolidated infrastructure from multiple data feeds and systems. Once the data is aggregated, an embodiment of the present invention may apply entitlements, reduce the dataset accordingly and dynamically provide a customized interactive interface where the user may generate reports and access analytics.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

Figure 1:
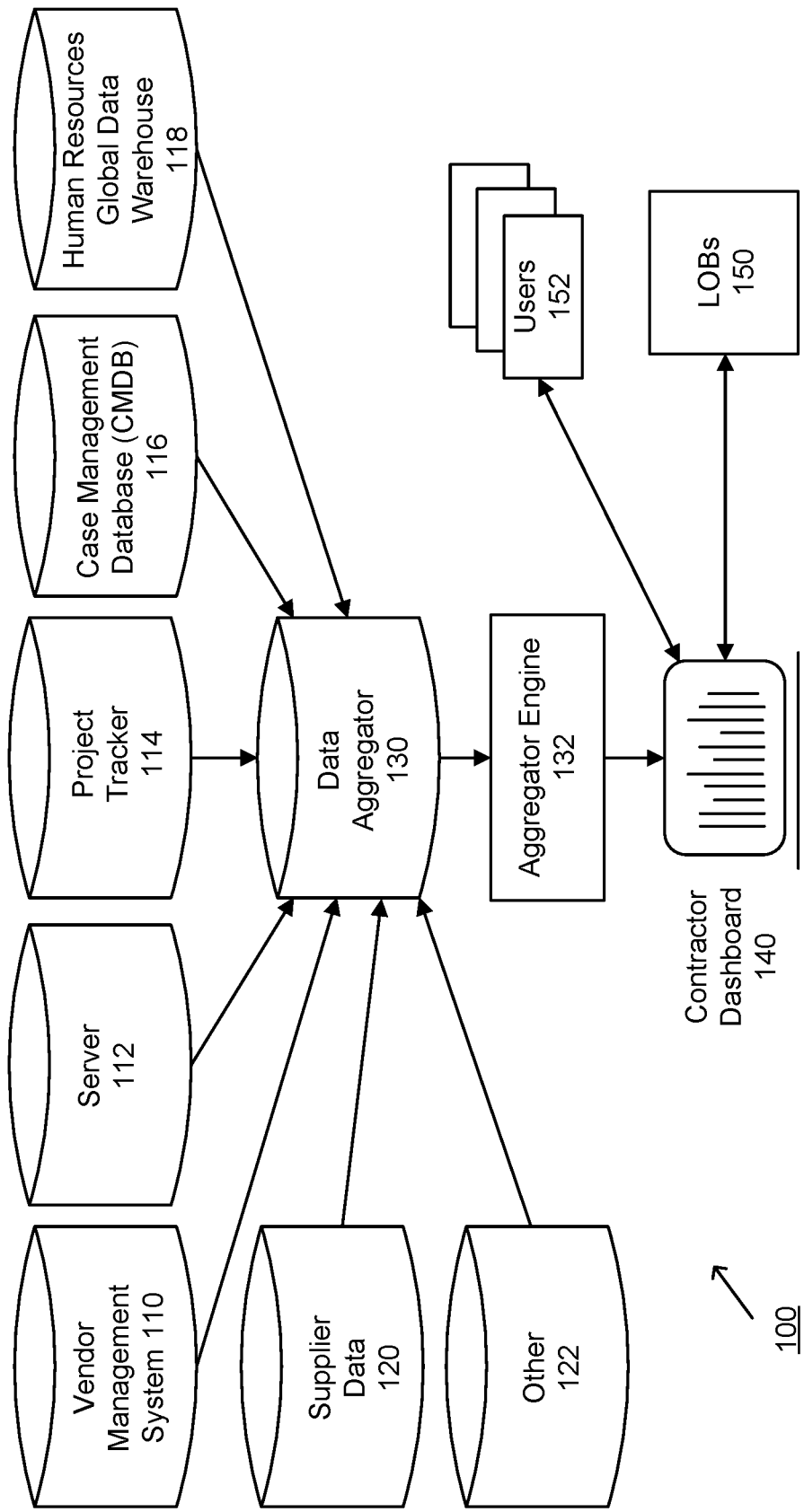
FIG. 1 illustrates a schematic diagram of a system that implements an interactive contractor dashboard, according to an exemplary embodiment.

FIG. 1 illustrates a schematic diagram of a system that implements an interactive contractor dashboard, according to an exemplary embodiment.

As illustrated, Data Aggregator 130 may aggregate data from various sources, internal as well as external. The data may be displayed via an interactive interface 140, represented by Contractor Dashboard. The interface may be communicatively coupled via a network communication with one or more data devices including, for example, computing devices associated with a line of business or other user. Such devices may include computers, desktops, laptops, tables, mobile devices, mobile phones, smart devices, etc. Users may represent internal users as well as external users, including third parties, suppliers, merchants, and/or other providers.

In addition, Data Aggregator 130 may be managed by an entity, such as a financial institution or other entity with multiple contractor relationships. The entity may support a system that includes Data Aggregator 130 and Aggregator Engine 132, User Interface 140 with various Views and processing components, including servers, processors, etc. Users may include users associated with various Lines of Businesses represented by 150 and other users 152. Data Aggregator 130 may retrieve, process, analyze and aggregate contractor data relating to a plurality of sources, represented by Vendor Management System (VMS) 110, Server 112 (e.g., enterprise servers, on-premise servers, cloud services, and other architectures and infrastructures), Project Tracker 114, Case Management Database (CMDB) 116 (e.g., onboarding system which stores data related to requisitions and pre-engagement activity), Human Resources Global Data Warehouse 118 (e.g., source of contingent worker reference and metadata), Supplier Data 120 and Other Data 122. Data Aggregator 130 may further pre-stage and filter the contractor data. Contractor profile data and historical data may be stored and managed by various databases. An embodiment of the present invention may also store reports, statistics and/or other analytics. The contractor dashboard features described herein may be provided by an Entity (e.g., financial institution, company, etc.) and/or a third party provider where the provider may operate with Entity.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 is depicted, it should be appreciated that other connections and relationships are possible. The system 100 described below may be used to implement the various methods herein, by way of example. Various elements of the system 100 may be referenced in explaining the exemplary methods described herein.

Communication links may represent a wireless network, a wired network or any combination of wireless network and wired network. For example, the network may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, communication links may support an Internet network, a wireless communication network, a cellular network, Bluetooth, or the like, or any combination thereof. Communication links may further include one, or any number of the exemplary types of networks mentioned above operating as a stand-alone network or in cooperation with each other. Communication links may utilize one or more protocols of one or more network elements to which it is communicatively coupled. Communication links may translate to or from other protocols to one or more protocols of network devices. Although each communication link may be depicted as one network for simplicity, it should be appreciated that according to one or more embodiments, the communication links may comprise a plurality of interconnected networks, such as, for example, a service provider network, the Internet, a cellular network, corporate networks, or even home networks, or any of the types of networks mentioned above.

Data may be transmitted and received via communication links utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 1 illustrates individual devices or components, it should be appreciated that there may be several of such devices to carry out the various exemplary embodiments. LOB 150 and Users 152 may communicate using any mobile or computing device, such as a laptop computer, a personal digital assistant, a smartphone, a smartwatch, smart glasses, other wearables or other computing devices capable of sending or receiving network signals. User devices may have an application installed that is associated with Entity.

Entity may be communicatively coupled to various storage mechanisms, such as databases. For example, the databases may store supplier data, etc. Database may include any suitable data structure to maintain the information and allow access and retrieval of the information. For example, Database may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein. Database may be any suitable storage device or devices.

Having described an example of the hardware, software, and data that can be used to run the system, an example of the method and user experience will now be described. The method will be described primarily as an example in system environment. However, those skilled in the art will appreciate that the principles of the invention can be applied to related circumstances.

Figure 2:
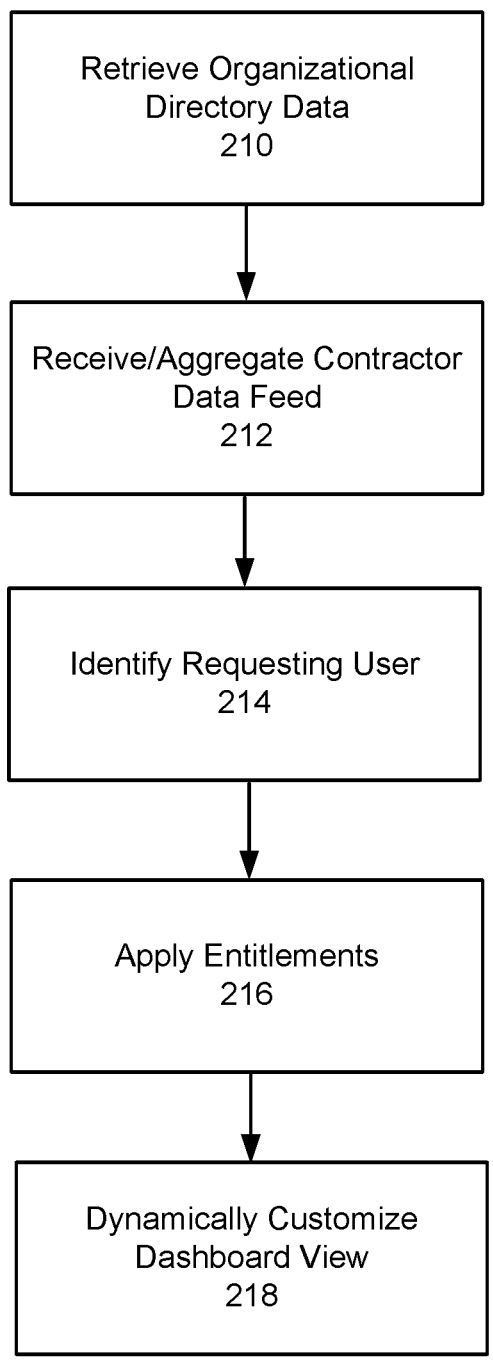
FIG. 2 is an exemplary flowchart for providing an interactive contractor dashboard, according to an exemplary embodiment.

FIG. 2 is an exemplary flowchart for providing an interactive contractor dashboard, according to an exemplary embodiment. At step 210, an organizational directory associated with an entity (e.g., company, etc.) may be identified and retrieved. At step 212, contractor data associated with the entity may be received and aggregated via a data feed from one or more data sources. At step 214, a requesting user may be identified, e.g., employee identifier, etc. At step 216, one or more entitlements associated with the employee identifier may be applied to the aggregated contractor data set. At step 218, the data set may be reduced and/or dynamically customized for the requesting employee. While the process of FIG. 2 illustrates certain steps performed in a particular order, it should be understood that the embodiments of the present invention may be practiced by adding one or more steps to the processes, omitting steps within the processes and/or altering the order in which one or more steps are performed. The steps are described in additional detail below.

At step 210, an organizational directory associated with an entity (e.g., company, etc.) may be identified and retrieved. For example, the organizational directory may identify various users within groups, such as lines of businesses, departments, teams, etc.

At step 212, contractor data associated with the entity may be received and aggregated via a data feed from one or more data sources. The contractor data may be aggregated from multiple sources. Contractor data may be further identified by lines of businesses or other grouping. The contract data may be further associated with users or groups of users.

An embodiment of the present invention may aggregate and link contractor data to an internal employee directory. By doing so, an embodiment of the present invention may dynamically identify data related to contractors that are in the direct management reporting hierarchy of the user.

At step 214, a requesting user may be identified, e.g., employee identifier, etc. The requesting user may be identified by an employee identifier which then associates the requesting user with a line of business, team, department, etc.

At step 216, one or more entitlements associated with the employee identifier may be applied to the aggregated contractor data set. According to an embodiment of the present invention, an entitlements model for the requesting user may be automatically derived and applied. For example, based on the employee's position, each employee may have a corresponding set of access to certain data and analytics. This may be represented as a hierarchical organizational tree or other format. For example, a first user may be identified as a junior level employee with responsibility for zero contractors. In this case, the first user would not be able to view any contractor data. A second user may be at a manager level and be responsible for a team of contractors. The second user may view data and associated analytics related to the team of contractors but not other contractors for a different manager. A third user may be at the top of the organizational chart. The third user may view all contractor related data managed by various employees within the organization.

At step 218, the data set may be reduced and/or dynamically customized for the requesting employee. For example, the employee may view data that is specifically relevant to the employee, e.g., contractors that report to the employee, etc. The employee may further view and analyze detailed data relevant to a specific contractor or group of contractors. Various filters and analytics may be applied.

For example, an embodiment of the present invention may apply a data model that specifies the relevant data that is available to a particular user or type of user. Accordingly, an embodiment of the present invention may be directed to generating and/or applying an entitlements model that may be derived and/or customized per logged-in user. For example, an embodiment of the present invention may manage and maintain data based on an organizational tree. An embodiment of the present invention automatically identify the logged-in user and dynamically build a customized user/manager hierarchy which then drives a data reduction procedure. This creates an automated and customized view per user based on their position in the organization. For each requesting user, a corresponding hierarchical tree of data may be identified and applied to the aggregated data.

For each entity, an organizational tree may be generated that represents rank and seniority for the users within an organization. For any user within the organization, a corresponding hierarchy tree may be identified that represents the user's seniority as well as direct and indirect subordinates, including contractors that report to the user. The hierarchy tree may form the basis of entitlements applied to the contractor data.

Figure 3:
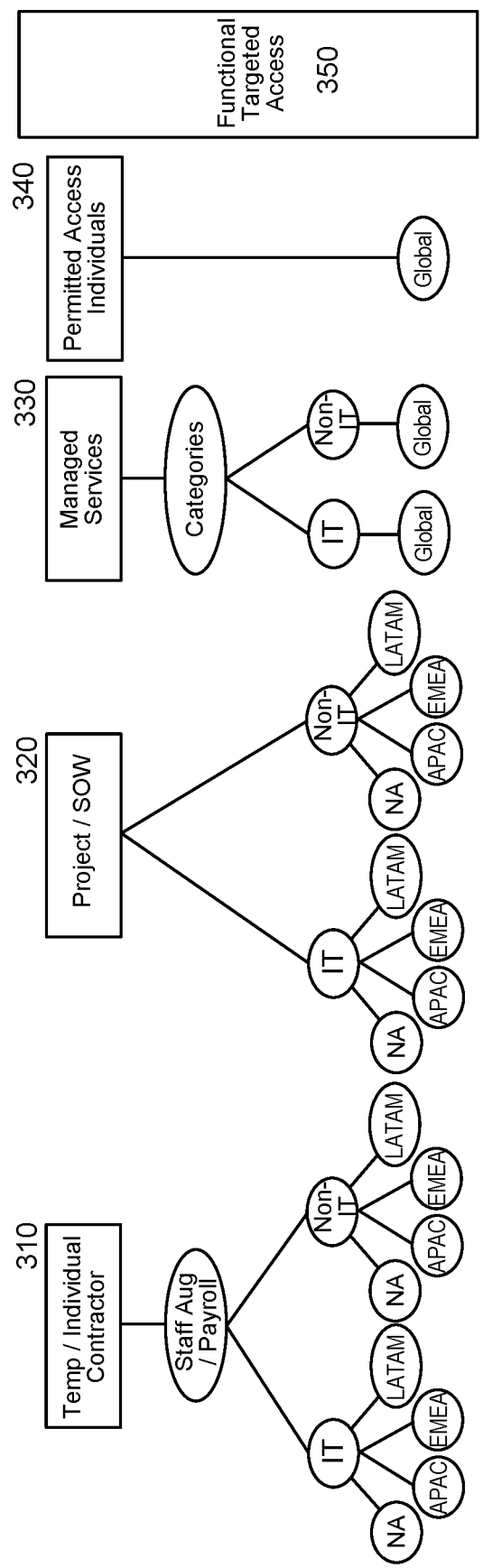
FIG. 3 is an exemplary illustration of various types of contractors and user, according to an embodiment of the present invention.

FIG. 3 is an exemplary illustration of various types of contractors and user, according to an embodiment of the present invention. FIG. 3 illustrates Temporary/Individual Contractors 310, Project/SOWs (Statement of Work) 320, Managed Services 330 and Permitted Access Individuals 340. Functional Target Access 350 represents different user data access rights and entitlements. Contractors may be further grouped by category (e.g., IT, non-IT, etc.) as well as region (e.g., North America, (NA), Asia-Pacific (APAC), Europe, Middle East and Africa (EMEA), Latin America (LATAM), Global, etc.). Other categories may be applied.

According to an exemplary application, an embodiment of the present invention may have multiple user groups. For example, the user groups may include: (1) Assignment Sponsors and their managers; (2) Vendor Management Officers, and (3) Contingent Worker Onboarding Administrators. Assignment Sponsors may represent managers of contractors, which may be associated with a default access level.

An embodiment of the present invention may aggregate and link contractor data to an internal employee directory. By doing so, an embodiment of the present invention may display data related to contractors that are in the direct management reporting hierarchy of the authenticated user. Vendor Management Officers may represent employees that manage supplier relationships who supply contract labor for a specific business unit. In this example, these individuals may be granted elevated access to view contractor data for a specific business unit. Contingent Worker Onboarding Administrators may work within Operations and cover onboarding activities for contractors across an entity, e.g., firm, etc. These individuals may be granted elevated access to the aggregated and linked data.

As shown in FIG. 3, Temporary and/or Individual Contractors 310 may be used as a temporary necessity. Contractors with specific skill sets may be required to augment an entity's existing staff for a limited time period. Temp/Individual Contractors 310 may further include Staff Augmentation categories to fulfill a temporary staffing need and/or function. These individuals may be fixed or hourly billable (or other arrangement) and fall into IT/non-IT functional areas. Temp/Individual Contractors 310 may be grouped into IT and non-IT with corresponding regions. Other categories may be applied.

Project/SOW 320 types of workers may be on a project or initiative with fixed end dates that involve a set of deliverables. These workers may not be intended to act as an augmentation of staff. Workers may be sourced through a particular deliverable or project which may be deliverable or time based service engagements. Project/SOW 320 may be grouped into IT and non-IT with corresponding regions. Other categories may be applied.

Managed Services 330 may involve individuals engaged for roles or functions that an entity does not handle as part of their normal business. Resources may be engaged to fill a service worker position to be managed by the applier. Services may be procured to support functions such as dining, couriers, cleaning services, telecom and security guards. Managed Services 330 may support various categories and be further grouped into IT and non-IT. In this example, the corresponding regions include global. Other categories may be applied.

Permitted Access Individuals 340 may represent individuals that are not contingent workers and do not provide a service to the entity. These resources may have non-employee IDs due to their need for access to buildings. Use of this service type may not be intended to represent a safe haven for LOB headcount considerations. In this example, Permitted Access Individuals 340 may be at a global level. Other categories may be applied. Functional Target Access 350 may identify and apply user data access rights and entitlements. This may be applied on an individual basis, user type, group and/or other basis.

FIGS. 4, 5A, 5B, 6 and 7 represent exemplary screenshots for illustration purposes for a particular application. The various embodiments of the present invention are not limited by the exemplary screenshots. Variations of the exemplary screenshots may be supported by other applications and scenarios.

Figure 4:
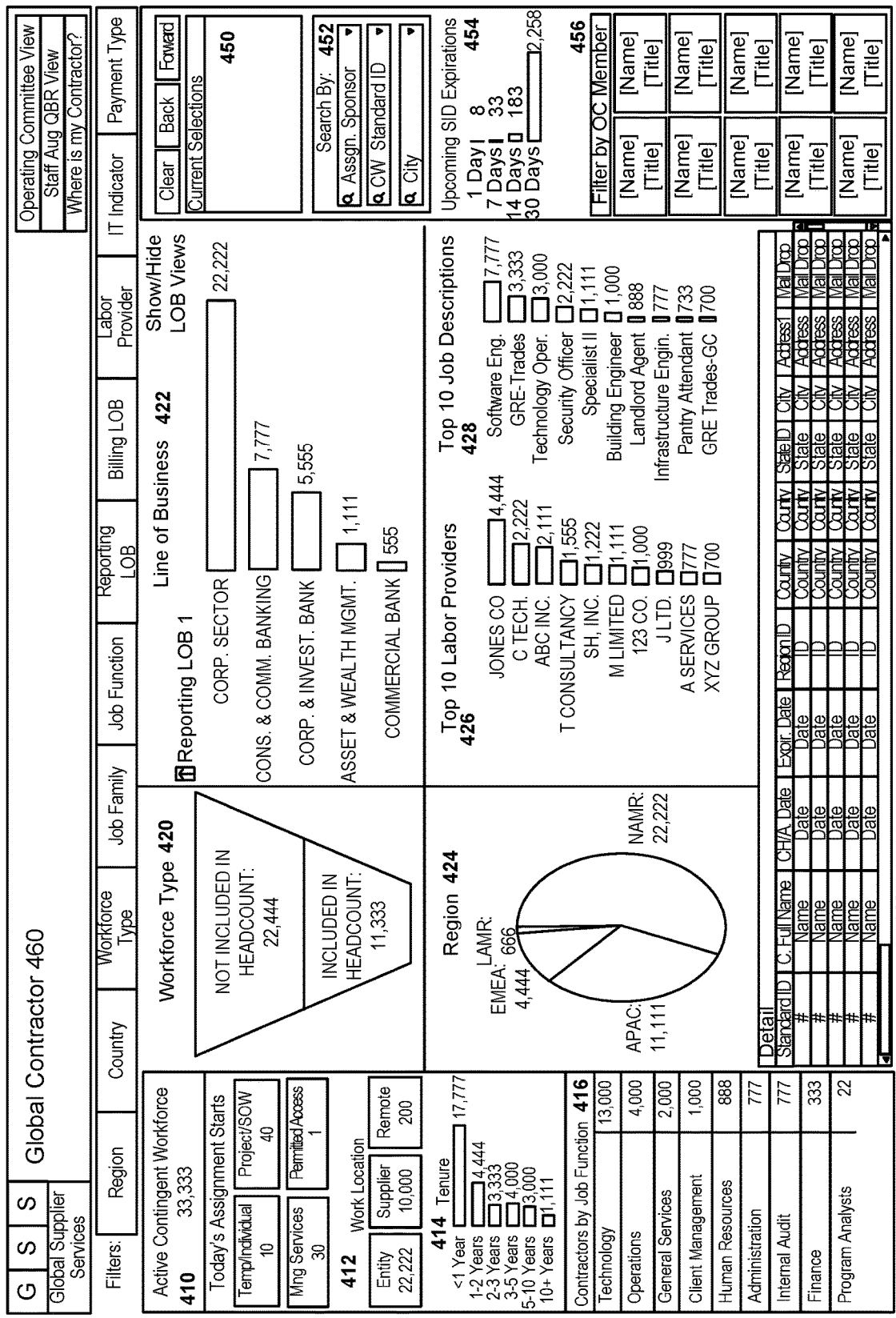
FIG. 4 is an exemplary Contractor Dashboard, according to an embodiment of the present invention.

FIG. 4 is an exemplary Contractor Dashboard, according to an embodiment of the present invention. The Contractor Dashboard provides a holistic view of contractor activity and metrics. According to an embodiment of the present invention, the Contractor Dashboard may access and/or leverage various data sources. In addition, the Contractor Dashboard may be accessed by various types of users. For example, sourcing managers may realize improved contract negotiations through a comprehensive view of contractors. Senior Executives may access the Contractor Dashboard as a one stop shop for a holistic contractor view. Management Officers may realize improved contractor management and increased visibility during contractor selection. For Risk Managers, an embodiment of the present invention provides visibility for better monitoring and control of risk and performance. Managers may access the Contractor Dashboard for transparency in managing full front-to-back contractor relationship. Executive Relationship Managers may access the Contractor Dashboard for a holistic view to understand key issues with contractors.

The illustration shown in FIG. 4 is one exemplary interface. Other variations may be implemented in accordance with the various embodiments of the present invention. As shown in FIG. 4, Contractor Dashboard may provide Active Contingent Workers 410, Work Location 412, Tenure 414 and Contractors by Job Function 416. Active Contingent Workers 410 may include assignment statistics, including temporary/individual; project/SOW; Managed Services and Permitted Access. Work Location 412 may include entity, supplier and remote locations.

Contractor Dashboard may also include Workforce Type 420, Line of Business 422, Region 424, Top Labor Providers 426 and Top Job Descriptions 428. Additional details may be provided at 440 which may include Identifier, Candidate name or identifier, current hire date, expiration date, country, state, city, address, etc.

Contractor Dashboard may further provide an interface for current selections at 450, Search at 452, Upcoming SID (standard identification) Expirations 454 and Filter by Member at 456.

Figure 5A:
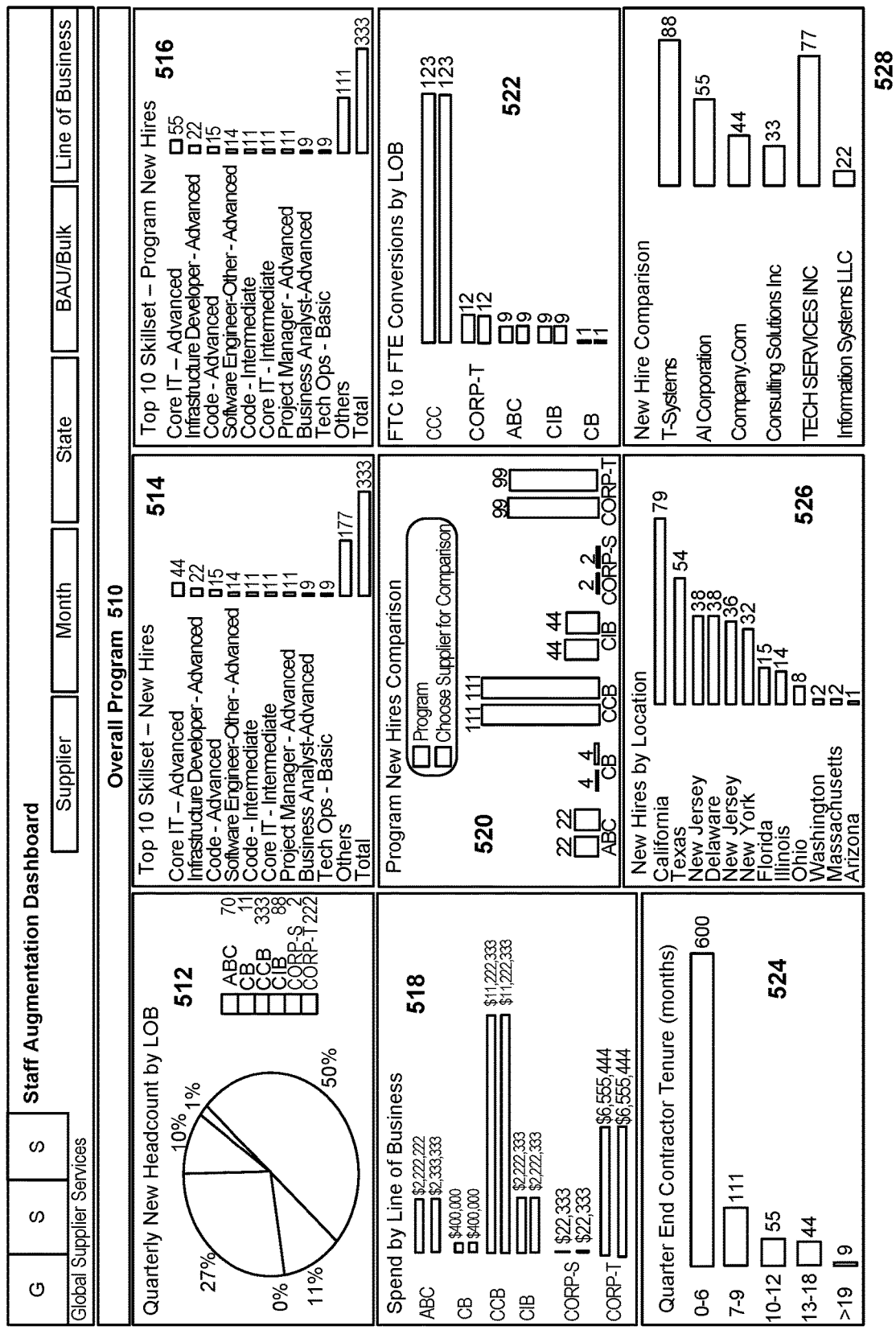

FIG. 5A is an exemplary Staff Augmentation Dashboard, according to an embodiment of the present invention. Overall Program 510 may include Quarterly New Headcount by LOB 512; Top Skillset—New Hires 514; Top Skillset—Program New Hires 516; Spend by Line of Business 518, Program New Hires Comparison 520; FTC (Full Time Contractor) to FTE (Full Time Employee) Conversions by LOB 522; Quarter End Contractor Tenure (months) 524, New Hires by Location 526 and New Hire Comparison 528.

FIG. 5B is an exemplary Staff Augmentation Dashboard, according to an embodiment of the present invention. Staff Augmentation Dashboard may provide Supplier SLA (Service Level Agreement) Breakdown 530 and Weighted Rankings 540. Supplier SLA Breakdown 530 may include SLA Category, Minimum Service Level, Actual Supplier Level, Performance Credit Weight, and Credit Amount. Weighted Rankings 540 may provide weighted rankings for each supplier.

Figure 6:
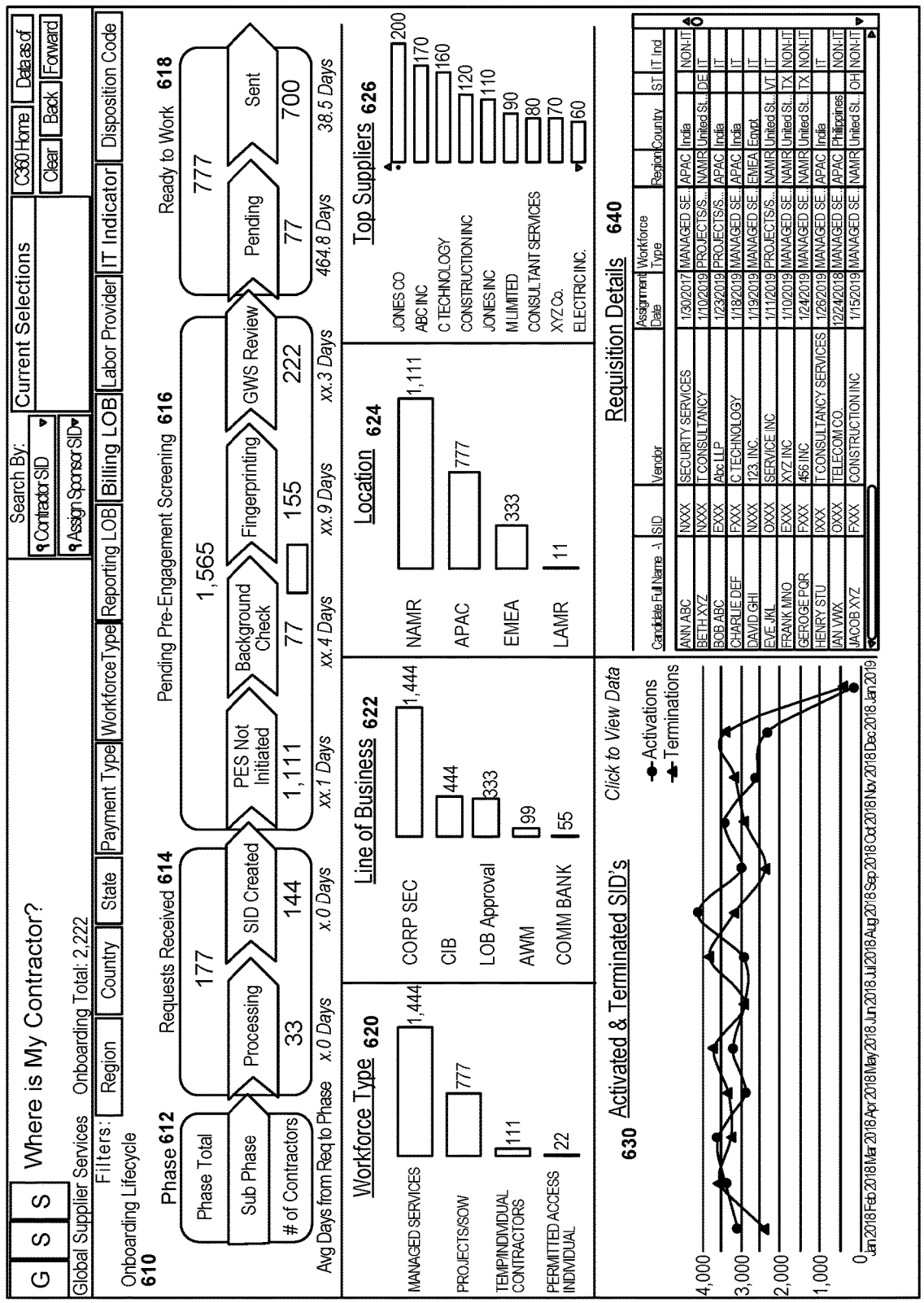
FIG. 6 is a Contractor Onboarding Detail interface, according to an embodiment of the present invention.

FIG. 6 is a Contractor Onboarding Detail interface, according to an embodiment of the present invention. Contractor Onboarding Detail interface may include an Onboarding Lifecycle 610, Workforce Type 620, Line of Business 622, Location 624, Top Suppliers 626, Activated and Terminated SIDs 630 and Requisition Details 640.

Onboarding Lifecycle 610 may include Phase 612 (e.g., phase total, sub phase, number of contractors), Requests Received 614 (e.g., processing, SID created, etc.), Pending Pre-Engagement Screening (PES) 616 (e.g., Pre-Engagement Screening Not Initiated, Background Check, Fingerprinting, Global Workforce Screening (GWS) Review, etc.) and Ready to Work 618 (e.g., Pending, Sent, etc.).

Other variations and data may be available through an embodiment of the present invention. The data may be applied to meet and address business goals and support a wide range of applications and scenarios.

For example, analytics may be applied to determine whether contractors require (or could benefit from) a resource, such as an access badge/card, system access, application access, work station, technical support, etc. An embodiment of the present invention may also verify contractor activity and work based on obtained data. This may involve determining whether the contractor is active based on actions, e.g., badge swipe, login, print request within a predetermined time period (e.g., last 30 days, etc.) and other activity.

Depending on a user's access level, a user may request to view data as another user. This may be represented as an "on behalf of" view. For example, a business manager may create an entitlement that enables the business manager view data as another team member, e.g., senior manager, etc.

An embodiment of the present invention may also provide analytics to determine whether a contractor should be converted to a full-time employee or other type of engagement or employment. For example, an entity may strive to reduce reliance on contractors thereby requesting a business justification for the contractor as opposed to a full-time or other employment. Other business goals and objectives may be realized.

FIG. 7 is a Staff Augmentation interface, according to an embodiment of the present invention. FIG. 7 illustrates staff augmentation bill rate analytics 710, which may include Resources by Line of Business 712, Top Rate Card Rate 714, Resources by Function 716, Rate Details 718, Resources by Location 720, Top Rate Variances 722, and Details 724. According to an exemplary illustration, Detail 724 may include Standard Identifier (SID), Candidate Name, Hire Date, Hourly Actual, Hourly Actual, SID Expiration Date, Region ID, Country, City, Department Name, IT, Job Family, etc.

Staff Augmentation interface provides an entity's staff augmentation contractor population and associated bill rate data. For example, bill rates and variances versus negotiated standard rate card may be provided. FIG. 7 further provides program and vendor managers with detail as to who, where and why certain resources are being paid above standard rates. In addition, elevated permissions may be established for this view due to the sensitivity of data displayed.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, FIG. 1 includes a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices 120, 130 or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer implemented method that dynamically provides an interactive contractor dashboard, the method comprising:
   identifying an organization directory associated with an entity from among one or more entities;
   retrieving, via an electronic input, the organization directory associated with the entity;
   receiving, via a contractor feed, contractor data associated with an entity where the contractor feed retrieves data from one or more sources of contractor data;
   aggregating, via an aggregator engine, the data from the one or more sources of contractor data;
   receiving, via a user input, a request from the user;
   identifying the user by an employee identifier that associates the user with a line of business, a team, and a department;
   deriving, via a computer processor, an entitlements model for the employee identifier, wherein the entitlements model comprises a customized hierarchy of data access and wherein the customized hierarchy represents a user's position within the organization directory;
   reducing a data set and dynamically generating, via a computer processor, a customized data set by applying the entitlements model to the data set;
   communicating, via an interactive contractor dashboard, the customized data set;
   determining, based on intelligence and data analytics, whether a contractor requires one or more resources from among an access card, a system access, an application access, a work station, and technical support; and
   permitting, by the customized hierarchy of access, the user to view the contractor data as another user when the user's position comprises a senior managerial role, wherein the other user is associated to a second employee identifier,
      wherein the interactive contractor dashboard comprises a plurality of segments representing workforce type, line of business, region, top labor providers, and top job descriptions,
      wherein the interactive contractor dashboard provides additional segments comprising: onboarding lifecycle process data and supplier service level agreement (SLA) breakdown data, and
      wherein the supplier SLA breakdown data includes: SLA category, minimum service level, actual supplier level, performance credit weight, and credit amount.

2. The method of claim 1, wherein the customized hierarchy is represented as an organizational tree for the user.

3. The method of claim 1, wherein the one or more sources of contractor data comprise internal and external sources of data.

4. The method of claim 1, wherein the contractor data represents data associated with temporary/individual contractors, project/Statement of Work (SOW) contractors, managed servers and permitted access individuals.

5. The method of claim 1, wherein the interactive contractor dashboard provides additional segments comprising: new headcount by line of business; top skillsets of new hires; and spend by lines of business.

6. The method of claim 1, wherein the interactive contractor dashboard provides additional segments comprising: workforce type; line of business; location; and top suppliers.

7. The method of claim 1, the method further comprising: applying the intelligence and the data analytics to generate statistics of contractor data.

8. The method of claim 1, the method further comprising: verifying, based on how the one or more resources are utilized, a legitimacy of activities of the contractor.

9. The method of claim 1, the method further comprising: determining, based on the intelligence and the data analytics, a future employment of at least one from among a current contractor and a prospective contractor.

10. A computer implemented system that dynamically provides an interactive contractor dashboard, the system comprising:
   an input configured to receive a contractor feed from a plurality of data sources;
   an interactive contractor dashboard configured to provide interactive contractor data based on dynamically generated entitlements model for a specific user; and
   an aggregator engine, coupled to the input and the interactive contractor dashboard, comprising a computer processor configured to:
      identify an organization directory associated with an entity from among one or more entities;

retrieve the organization directory associated with the entity;

receive, via the contractor feed, contractor data associated with an entity where the contractor feed retrieves data from one or more sources of contractor data;

aggregate, via the aggregator engine, the data from the one or more sources of contractor data;

receive a request from the user;

identify the user by an employee identifier that associates the user with a line of business, a team, and a department;

derive, via the computer processor, an entitlements model for the employee identifier, wherein the entitlements model comprises a customized hierarchy of data access and wherein the customized hierarchy represents a user's position within the organization directory;

reduce a data set and dynamically generate, via the computer processor, a customized data set by applying the entitlements model to the data set;

communicate, via the interactive contractor dashboard, the customized data set;

determine, based on intelligence and data analytics, whether a contractor requires one or more resources from among an access card, a system access, an application access, a work station, and technical support; and permit, by the customized hierarchy of access, the user to view the contractor data as another user when the user's position comprises a senior managerial role, wherein the other user is associated to a second employee identifier, wherein the interactive contractor dashboard comprises a plurality of segments representing workforce type, line of business, region, top labor providers, and top job descriptions, wherein the interactive contractor dashboard provides additional segments comprising: onboarding lifecycle process data and supplier service level agreement (SLA) breakdown data, and wherein the supplier SLA breakdown data includes: SLA category, minimum service level, actual supplier level, performance credit weight, and credit amount.

11. The system of claim 10, wherein the customized hierarchy is represented as an organizational tree for the user.

12. The system of claim 10, wherein the one or more sources of contractor data comprise internal and external sources of data.

13. The system of claim 10, wherein the contractor data represents data associated with temporary/individual contractors, project/Statement of Work (SOW) contractors, managed servers and permitted access individuals.

14. The system of claim 10, wherein the interactive contractor dashboard provides additional segments comprising: new headcount by line of business; top skillsets of new hires; and spend by lines of business.

15. The system of claim 10, wherein the interactive contractor dashboard provides additional segments comprising: workforce type; line of business; location; and top suppliers.

16. The system of claim 10, the computer processor further configured to: apply the intelligence and the data analytics to generate statistics of contractor data.

17. The system of claim 10, the computer processor further configured to:
verify, based on how the one or more resources are utilized, a legitimacy of activities of the contractor.

18. The system of claim 10, the computer processor further configured to: determine, based on the intelligence and the data analytics, a future employment of at least one from among a current contractor and a prospective contractor.

* * * * *